US010065363B2

(12) United States Patent
Schiccheri et al.

(10) Patent No.: US 10,065,363 B2
(45) Date of Patent: Sep. 4, 2018

(54) METHOD OF SIMULTANEOUS LASER WELDING OF AN AUTOMOTIVE LIGHT AND RELATED AUTOMOTIVE LIGHT

(71) Applicant: Automotive Lighting Italia S.p.A. a Socio Unico, Turin (IT)

(72) Inventors: Nicola Schiccheri, Turin (IT); Cristiano Boero, Turin (IT); Domenico Ferigo, Turin (IT); Fabio Leone, Turin (IT)

(73) Assignee: Automotive Lighting Italia S.p.A. a Socio Unico, Turin (IT)

( * ) Notice: Subject to any disclaimer, the term of this patent is extended or adjusted under 35 U.S.C. 154(b) by 355 days.

(21) Appl. No.: 14/739,861

(22) Filed: Jun. 15, 2015

(65) Prior Publication Data
US 2016/0236403 A1   Aug. 18, 2016

(30) Foreign Application Priority Data

Jun. 19, 2014   (IT) .............................. PD2014A0152

(51) Int. Cl.
*B29C 65/16*   (2006.01)
*B29C 65/54*   (2006.01)
(Continued)

(52) U.S. Cl.
CPC .......... *B29C 65/16* (2013.01); *B23K 26/0006* (2013.01); *B23K 26/206* (2013.01);
(Continued)

(58) Field of Classification Search
CPC . B29C 65/16; B29C 65/1635; B29C 65/1667; B29C 65/167; B29C 65/1687;
(Continued)

(56) References Cited

U.S. PATENT DOCUMENTS

2002/0008089 A1*   1/2002   Grewell ............... B23K 26/073
                                             219/121.63
2006/0186095 A1*   8/2006   Kan .................... B23K 26/0734
                                             219/121.67
(Continued)

FOREIGN PATENT DOCUMENTS

CN   103807715 A   5/2014
CN   103842156 A   6/2014
(Continued)

OTHER PUBLICATIONS

Search Report dated Feb. 9, 2015 for Italian App. No. PD2014A000152.
(Continued)

*Primary Examiner* — Daniel McNally
(74) *Attorney, Agent, or Firm* — Howard & Howard Attorneys PLLC

(57) ABSTRACT

A welding apparatus for making an automotive light including light guides having an inlet which receives the fibers the laser beam produced by the laser emitting device and an outlet which propagates/transmits the laser beam collimated by said guides. The light guide has respective free ends mechanically separated from each other, wherein the light guides are configured so as to direct collimated light beams on adjacent and locally continuous portions of welding interface so as to obtain a homogeneous and uniform distribution of the light beams along the welding interface.

20 Claims, 13 Drawing Sheets

(51) Int. Cl.
    *B29C 65/00*     (2006.01)
    *F21V 17/10*     (2006.01)
    *B23K 26/00*     (2014.01)
    *B23K 26/20*     (2014.01)
    *B23K 26/324*     (2014.01)
    *F21S 41/29*     (2018.01)
    *F21S 43/19*     (2018.01)
    *F21S 43/27*     (2018.01)
    *B29L 31/00*     (2006.01)
    *B29C 65/08*     (2006.01)
    *B29C 65/20*     (2006.01)
    *B29C 65/06*     (2006.01)
    *B29L 31/30*     (2006.01)

(52) U.S. Cl.
    CPC .......... *B23K 26/324* (2013.01); *B29C 65/167* (2013.01); *B29C 65/1635* (2013.01); *B29C 65/1667* (2013.01); *B29C 65/1687* (2013.01); *B29C 65/542* (2013.01); *B29C 66/1142* (2013.01); *F21S 41/29* (2018.01); *F21S 43/19* (2018.01); *F21S 43/27* (2018.01); *F21V 17/101* (2013.01); *B29C 65/06* (2013.01); *B29C 65/08* (2013.01); *B29C 65/20* (2013.01); *B29C 66/30223* (2013.01); *B29L 2031/3055* (2013.01); *B29L 2031/747* (2013.01)

(58) Field of Classification Search
    CPC .. B29C 65/542; B32L 26/0006; B32L 26/206; B32L 26/324
    See application file for complete search history.

(56) References Cited

U.S. PATENT DOCUMENTS

2011/0203726 A1*   8/2011   Zaitsu ................. B29C 65/1635
                                                                    156/272.8
2013/0025793 A1*   1/2013   Le Monnier ........ B29C 65/1635
                                                                    156/379.6
2014/0216648 A1    8/2014   Geiger et al.

FOREIGN PATENT DOCUMENTS

| DE | 102006008060 A1 | 8/2006 |
|---|---|---|
| EP | 2923819 A1 | 9/2015 |
| EP | 2923820 A1 | 9/2015 |
| FR | 2 952 316 A1 | 5/2011 |
| FR | 2957841 B1 | 7/2012 |
| JP | 2011161633 A | 8/2011 |
| JP | 2014-100867 A | 6/2014 |

OTHER PUBLICATIONS

Extended European Search Report for European App. No. 15165776.4 dated Nov. 3, 2015.

Search Report issued for Chinese Application No. 2015103425883 dated Dec. 20, 2017.

* cited by examiner

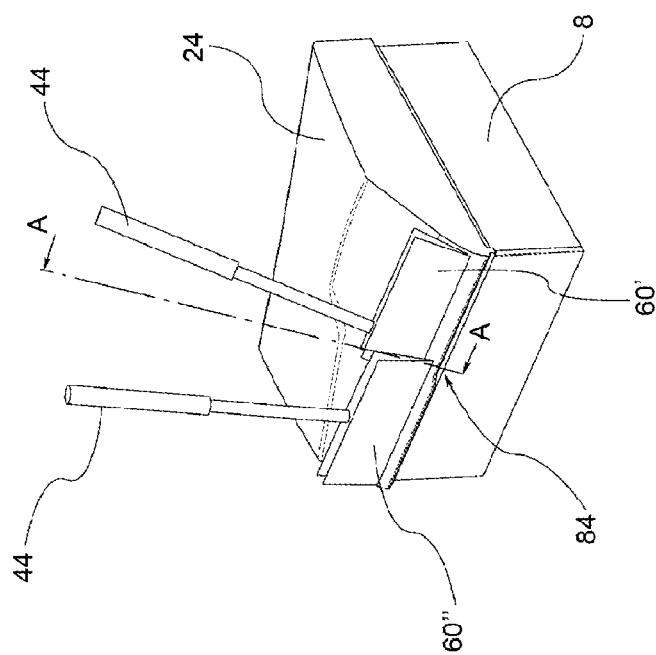
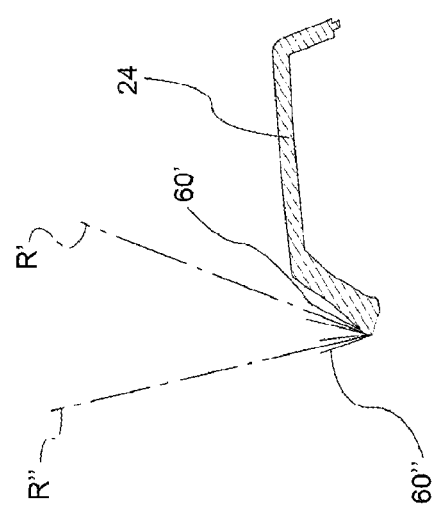
Fig. 12
Fig. 12A

METHOD OF SIMULTANEOUS LASER WELDING OF AN AUTOMOTIVE LIGHT AND RELATED AUTOMOTIVE LIGHT

CROSS-REFERENCE TO RELATED APPLICATIONS

The present application claims priority to and all the benefits of Italian Patent Application No. PD2014A000152, filed on Jun. 19, 2014, which is hereby expressly incorporated herein by reference in its entirety.

BACKGROUND

Field of the Invention

The present invention relates to a method of simultaneous laser welding of an automotive light and relative automotive light obtained using said method.

Description of the Related Art

The term automotive light is understood to mean indifferently a rear automotive light or a front automotive light, the latter also known as a headlight.

As is known, an automotive light is a lighting and/or signalling device of a vehicle comprising at least one external automotive light having a lighting and/or signalling function towards the outside of the vehicle such as for example a sidelight, an indicator light, a brake light, a rear fog light, a reverse light, a dipped beam headlight, a main beam headlight and the like.

The automotive light, in its simplest form comprises a container body, a lenticular body and at least one light source.

The lenticular body is placed so as to close a mouth of the container body so as to form a housing chamber. The light source is arranged inside the housing chamber, which may be directed so as to emit light towards the lenticular body, when powered with electricity.

The method of manufacture of an automotive light, once assembled the various components, must provide for the attachment and hermetic sealing of the lenticular body to the container body.

Such sealing and attachment is usually performed by welding so as to create a weld bead between the perimetral profiles, respectively, of the lenticular body and the container body placed in contact with each other.

Naturally, the welding may also regard other components of a more complex automotive light, for example arranged inside the housing chamber.

A process of laser welding of polymeric bodies particularly of an automotive light makes it possible to combine a transmissive or transparent polymeric body, capable of transmitting a laser radiation, and an absorbent polymeric body, capable of absorbing the laser radiation. In the present case, the laser radiation is transformed into heat when it encounters the absorbent polymeric body which heating locally transfers heat to the transmissive polymeric body, as far as a softening and a local melting of both polymeric bodies, which thus join firmly to each other.

The absorbent polymeric body of an automotive light may be constituted, for example, by the container body, while the transmissive polymeric body of a automotive light may be constituted, for example, by the lenticular body, which closing the container body forms a housing chamber housing a light source of the automotive headlight.

The housing chamber is delimited at the perimeter by the perimetral profiles of the container body and of the lenticular body which, placed in contact with each other, are sealed by the formation of a weld bead, at which the interpenetration of the materials of the lenticular body and the container body takes place.

Of course, the absorbent and transmissive polymeric bodies can be composed generically by further polymeric components of the automotive headlight.

The laser equipment that is typically used for this purpose generally includes:

- at least a laser source, which can for example be a semiconductor laser source,
- a system of optical fibres grouped together in a "bundle" which serves to transport the laser light produced by the laser source, in the vicinity of the lenticular body,
- an optical fibre support which has the purpose of holding the optical fibres in position in the vicinity of the lenticular body. For example, the support may be a metal body with housing holes in which the optical fibres are contained. They may be attached by a system in which the head of a screw, which is screwed to the metal support of the optical fibres, presses a polymer washer which expands radially. The optical fibre is thus blocked by the polymer washer on the housing hole walls,
- an optical system, with the function of a collimator, which has the purpose of modifying the divergence of the laser beam coming out of the fibre and directing said beam towards the weld bead.

Typically, as a collimator, a negative light guide is used, i.e. a light guide formed of reflective walls.

In the simplest version of the prior art, the light guide has a geometry with reflecting walls inclined with respect to its optical axis and the optical fibre is positioned in the vicinity of the upper opening of the light guide and along the optical axis. Again in the simplest case, the system proves to be symmetric on the transversal plane of the light guide, i.e. the inclination of the reflective walls of the light guide is the same with respect to the optical axis. Longitudinally, the light guide extends along the trajectory which defines the weld bead.

Alternatively, the light guide may be made of a solid polymer body and fitted with reflective internal walls, able to direct the laser radiation inside said polymer body by multiple reflections.

In some applications, such as those typical of automotive lights, the light guide rests an outlet opening thereof, which emits laser radiation, along a multiform support trajectory, made on an outer surface of the lenticular body transparent to laser radiation. The latter is placed adjacent to a container body absorbing the laser radiation, so as to define the weld bead, also multiform, and typically dissimilar from the multiform support trajectory.

It is to be noted that the light guide lying on the lenticular body could direct the laser radiation towards a weld bead defined by at least one polymer component to be welded extraneous to said lenticular body and/or said container body, contained however in an area bounded by the latter.

The light guide of the conventional simultaneous laser welding apparatus extends without interruption on the outer surface of the lenticular body at the weld bead, in an effort to reach it with sufficient energy to soften the container body, thereby enabling the welding process. The laser radiation coming out from the opening of the light guide may however undergo refraction during its entry into the lenticular body, as well as one or more reflections inside the lenticular body itself, before reaching the weld bead.

Unfortunately, in automotive light applications it happens that the laser radiation coming out from the exit aperture of the light guide reaches the weld bead heterogeneously, with sections of the weld bead reached by insufficient energy to soften the container body. This is caused by the fact that the geometry of the lenticular body is typically complex, including on account of the presence of ribs, changes of curvature or the like, and the weld bead extends in a multiform manner.

Lenticular bodies tend, in fact, for stylistic and aerodynamic reasons to be increasingly complex and to have on their outer surface, surfaces with discontinuities such as ribs, chamfers, fillets, draughts, etc. The complex shape of the lenticular bodies and discontinuities present on the surface of the lenticular body may make the transposition of the laser beam from the optical fibre to the weld bead difficult and inefficient despite the action of the light guide.

In fact on account of the complex shape of the lenticular body, the weld bead proves not conformal to the lenticular body, i.e. it may not be a translation of the lenticular body.

It is clear that if the weld bead is unevenly reached by the laser radiation, an increase in the power of the laser radiation, to overcome the lack in the portions poorly irradiated would be excessive in the portions of the weld bead irradiated sufficiently, with the risk of damage to portions of the lenticular body and the container body.

It follows that, in the case of simultaneous welding of automotive lights where the lenticular body usually has complex geometries (such as variations of concavities/complexity, grooves, ribs, protuberances, and the like), the solutions of the prior art of laser welding are not satisfactory in terms of quality of the weld bead generated.

In the light of all the above considerations, laser welding techniques are little used to date on automotive lights, especially if they have a complex geometry; such laser welding techniques are thus replaced by alternative welding techniques, such as friction, ultrasonic, hot-plate welding and the like.

SUMMARY OF THE INVENTION

The purpose of the present invention is to obtain a method of laser welding of an automotive light and an automotive light obtained using the method able to ensure a laser welding process making it possible to obtain a quality weld with any geometry of the lenticular body, even if highly complex and strongly variable in its extension.

The purpose of the present invention is therefore to perform welding of automotive lights by a laser welding technique overcoming the technical drawbacks related to the specific nature of automotive lights which to date make said welding technique not very efficient.

Accordingly, the present invention is directed toward a welding apparatus for making an automotive light including a locking mechanism interconnecting a container body and a lenticular body to be welded to each other. The container body has a first perimeter profile and the lenticular body has a second perimeter profile which, placed in contact with each other, define a welding interface to be welded by the apparatus. The apparatus further includes a laser emitting device that emits a laser beam and a plurality of fibres which receive portions of the laser beam from the laser source and direct them towards the welding interface through the lenticular body. The container body acts as an absorbing element toward the light beam and the lenticular body acts as a transmissive element of the light beam. Light guides are employed for changing the divergence of the portions of the laser beams outgoing from the fibres, so as to collimate them over all along relative optical axes. The light guides include an inlet which receives from the fibres the laser beam produced by the laser emitting device and an outlet which propagates/transmits the laser beam collimated by the light guides themselves. The light guides include respective free ends mechanically separated from each other and are configured so as to direct collimated light beams on adjacent and locally continuous portions of welding surfaces so as to obtain a homogenous and uniform distribution of the light beams along the welding interface.

The present invention is also directed toward a method of simultaneous welding of an automotive light. The method includes the steps of providing a container body delimited by a first perimeter profile and providing a lenticular body internally delimited by a second perimeter profile. The method further includes a step of mutually associating at least partially respective first and second perimeter profiles of the container body and the lenticular body wherein the contact surface between the perimeter profiles defines a welding surface, and providing at least one laser emitting device which emits a light beam or radiation having a characteristic emission spectrum. The method further includes the steps of providing a plurality of fibres which receive portions of the laser beam from the laser emitting device and direct them towards the welding interface through the lenticular body, wherein the container body acts as an absorbing element toward the light beam and the lenticular body acts as a transmissive element of the light beam. In addition, the method includes the step of providing light guides for changing the spatial distribution of the portions of laser beams outgoing from the fibres, so as to collimate them over all along at least a predetermined optical axis, wherein the optical devices include an inlet which receives from the fibres the laser beam produced by the laser emitting device and an outlet which propagates/transmits the collimated laser beam. The method also includes the steps of arranging adjacent light guides having respective free ends mechanically separated from each other and configuring the light guides so as to direct collimated light beams on adjacent and locally continuous portions of the welding surface so as to obtain a homogenous and uniform distribution of the light beams along the welding interface.

Other embodiments of the present invention are described in the dependent claims.

DESCRIPTION OF THE DRAWINGS

Further characteristics and advantages of the present invention will be more clearly comprehensible from the description given below of its preferred and non-limiting embodiments, wherein:

FIGS. 12-15 show perspective views of welding apparatus according to further embodiments of the present invention;

FIG. 12A is a cross-section view of the welding apparatus in FIG. 12, along the cross-section plane A-A in FIG. 12;

The elements or parts of elements common to the embodiments described below will be indicated using the same reference numerals.

DETAILED DESCRIPTION OF THE INVENTION

Figure 1:
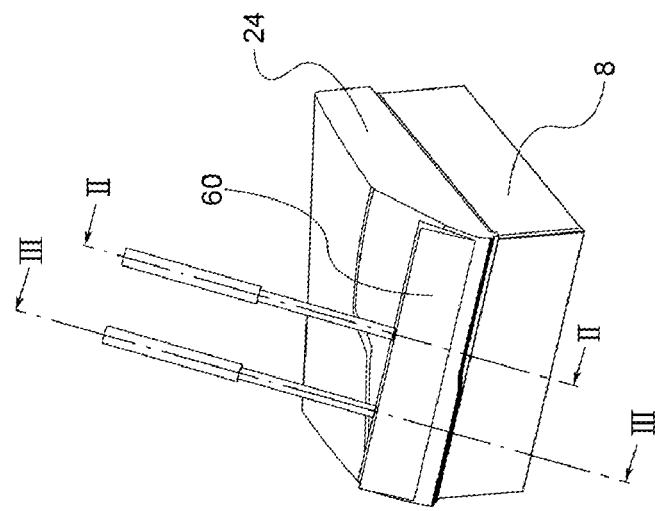
FIG. 1 is a perspective view, in an assembled configuration, of a laser welding apparatus of an automotive light according to the prior art.
Figure 2:
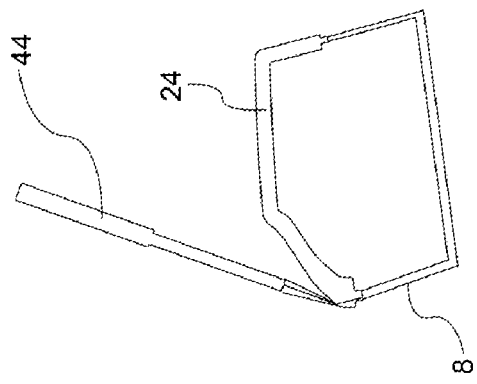
FIG. 2 is a cross-section view of the apparatus in the figure, along the cross-section plane II-II in FIG. 1.
Figure 3:
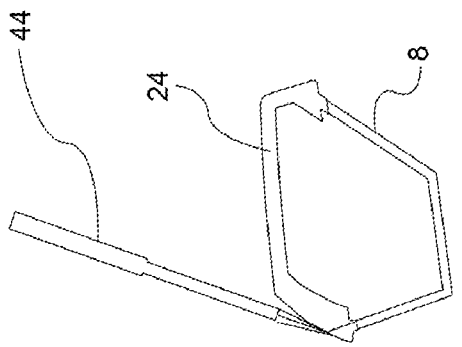
FIG. 3 is a cross-section view of the apparatus in the figure, along the cross-section plane III-III in FIG. 1.
Figure 4:
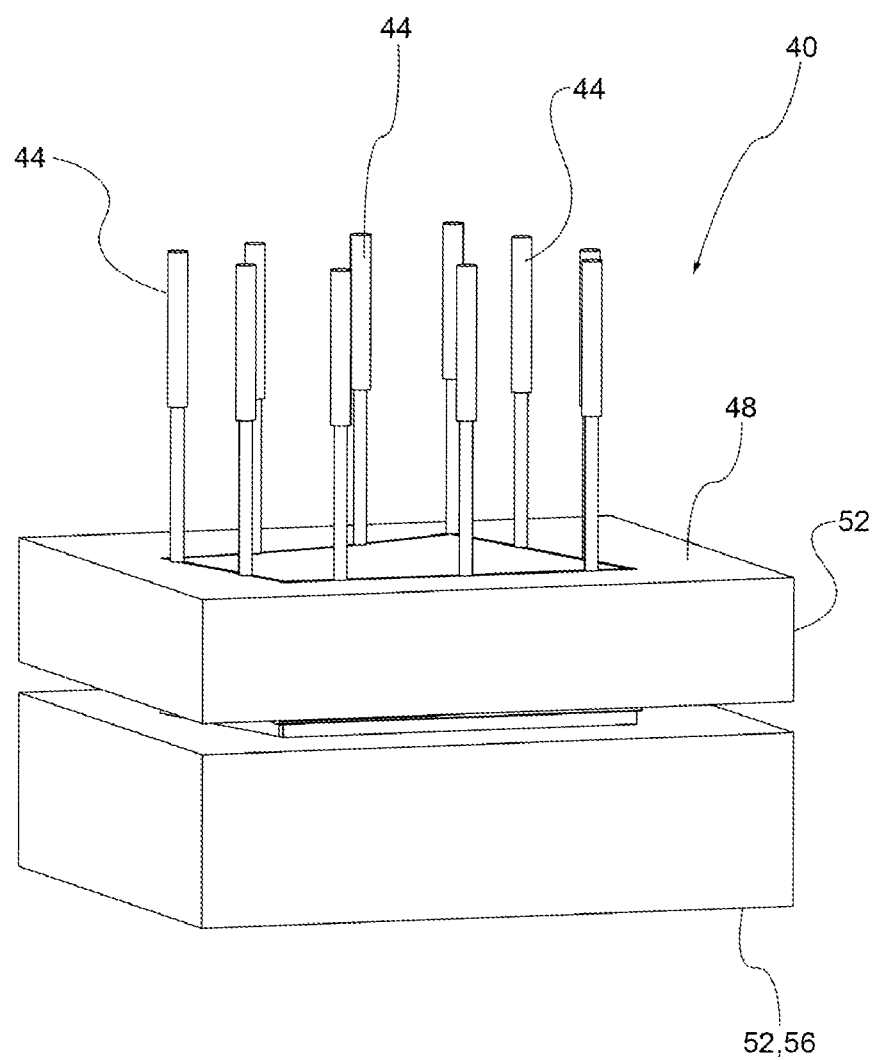
FIG. 4 is a perspective view, in an assembled configuration, of a welding apparatus of an automotive light according to one embodiment of the present invention.
Figure 5:
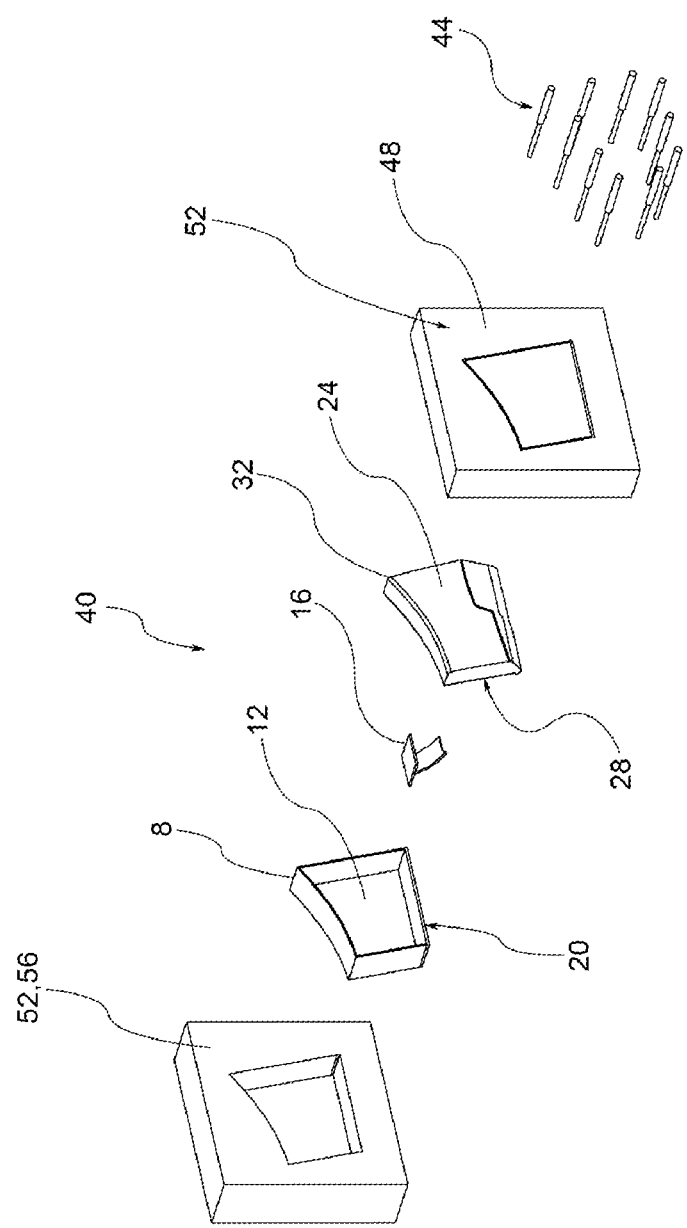
FIG. 5 is a perspective view in separate parts of the apparatus in FIG. 4.
Figure 6:
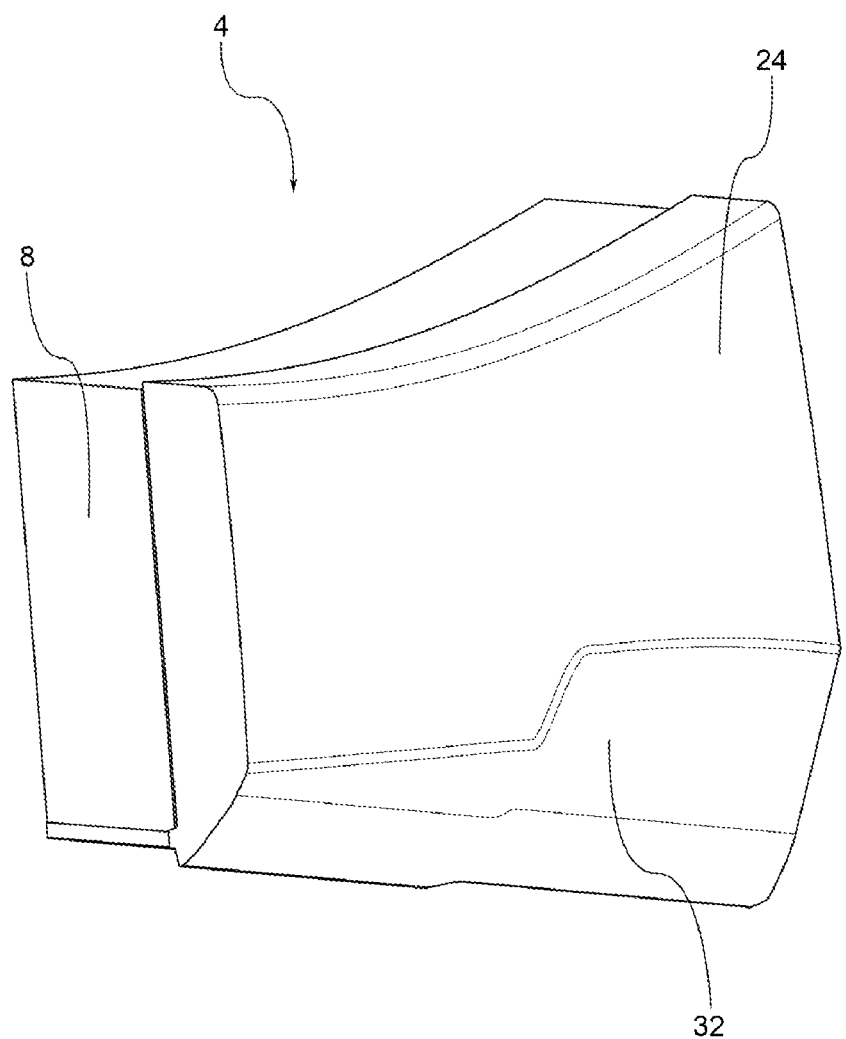
FIG. 6 is a perspective view of an automotive light in an assembled configuration, according to the present invention.
Figure 7:
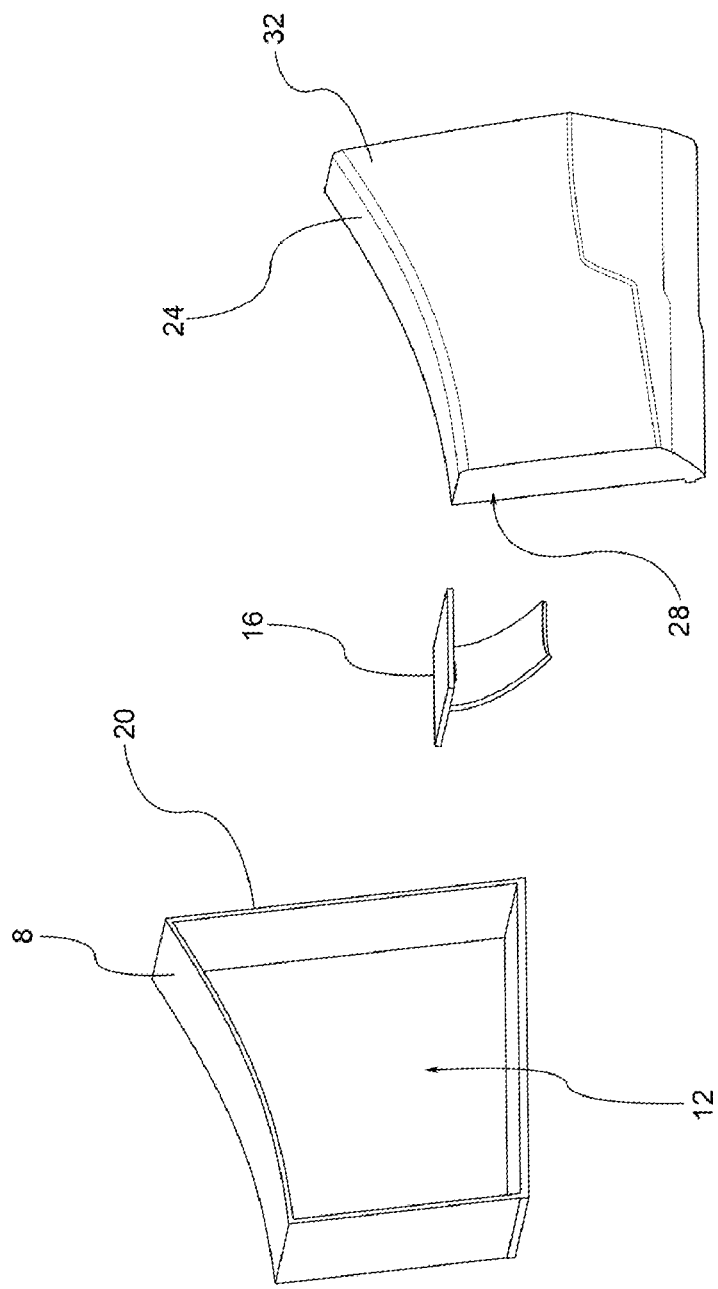
FIG. 7 is a perspective view in separate parts of the light in FIG. 6.
Figure 8:
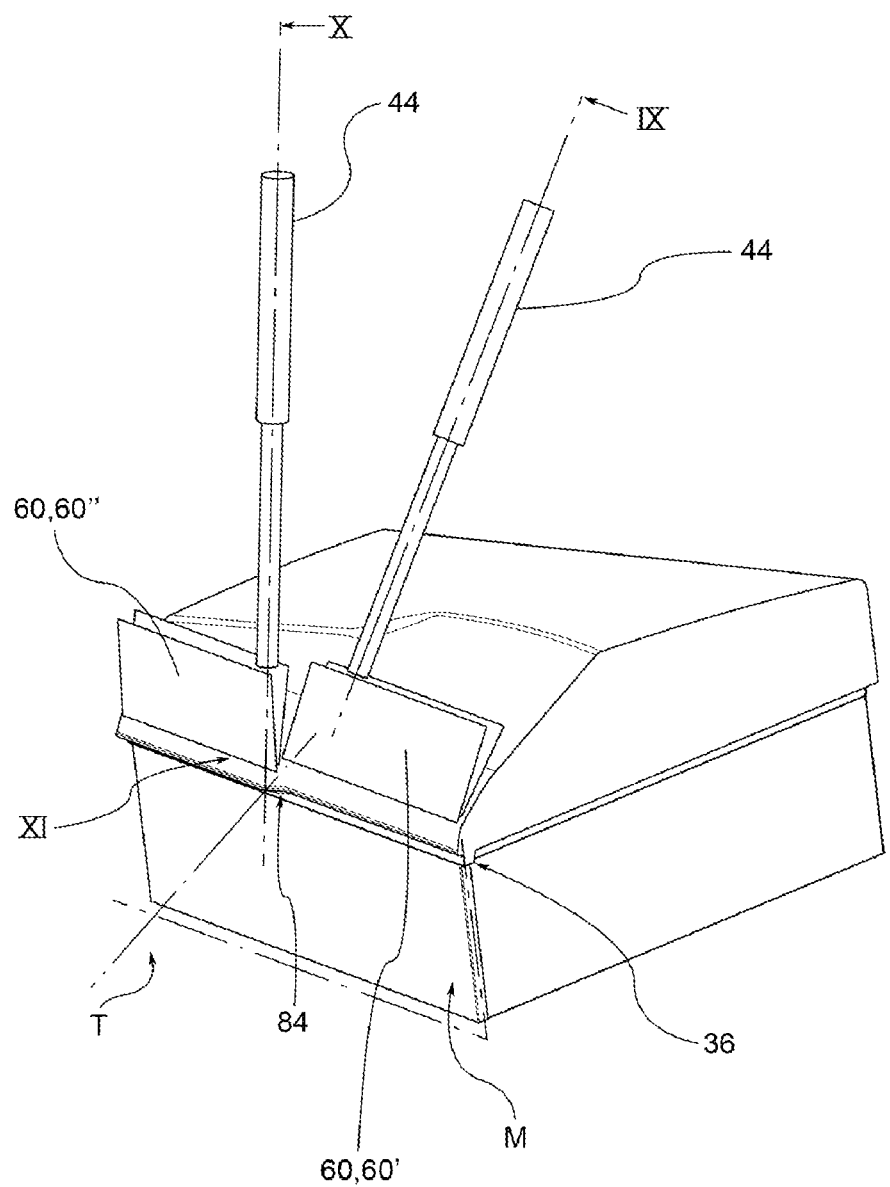
FIG. 8 shows the welding apparatus according to a possible embodiment of the present invention.
Figure 9:
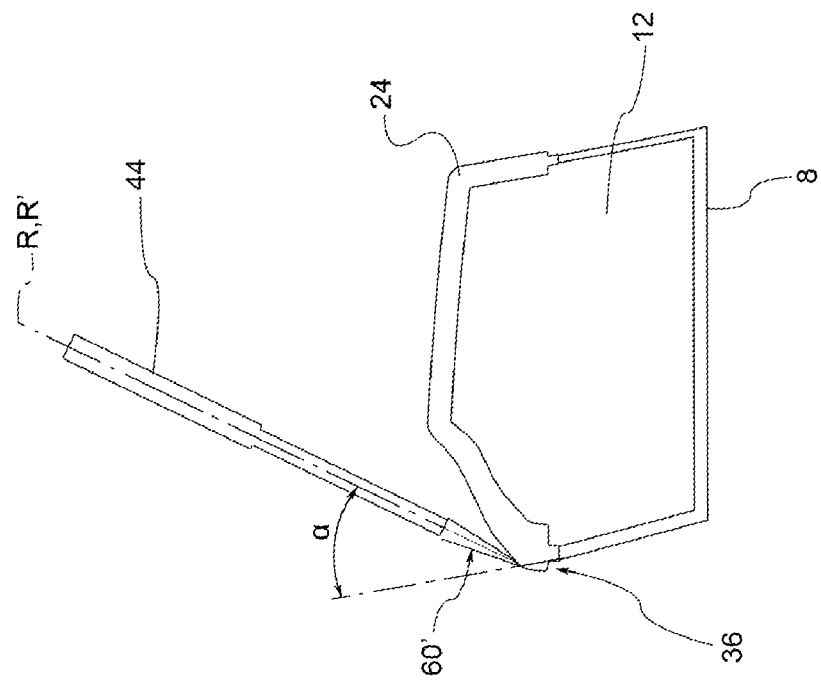
FIG. 9 is a cross-section view of the welding apparatus in FIG. 8, along the cross-section plane IX-IX in FIG. 8.
Figure 10:
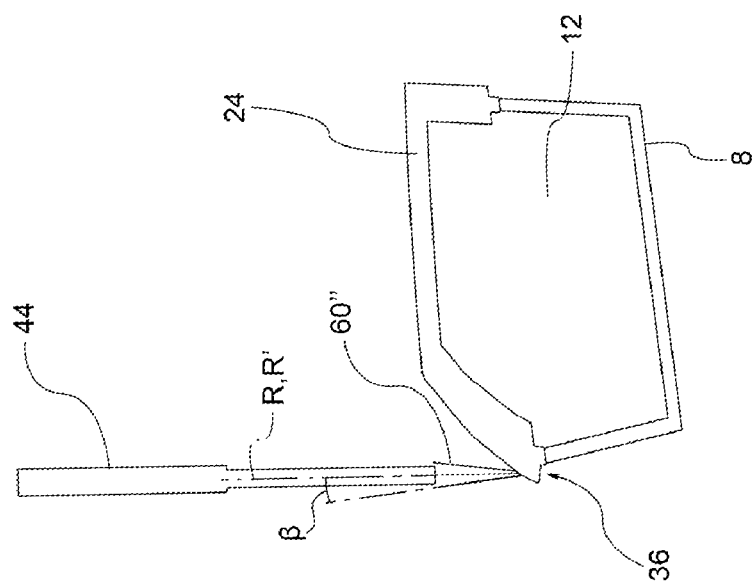
FIG. 10 is a cross-section view of the welding apparatus in FIG. 8, along the cross-section plane X-X in FIG. 8.
Figure 11:
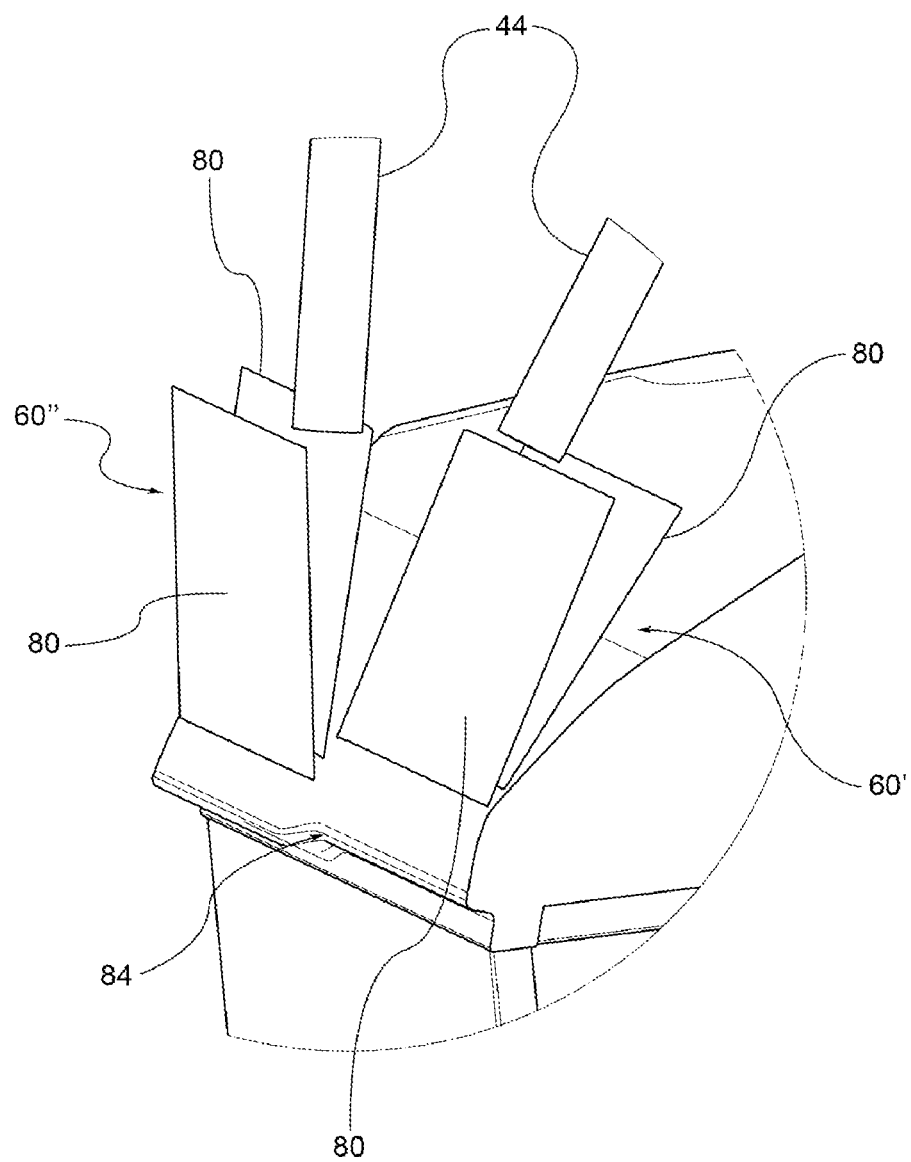
FIG. 11 shows the enlarged detail XII in FIG. 8.
Figure 13:
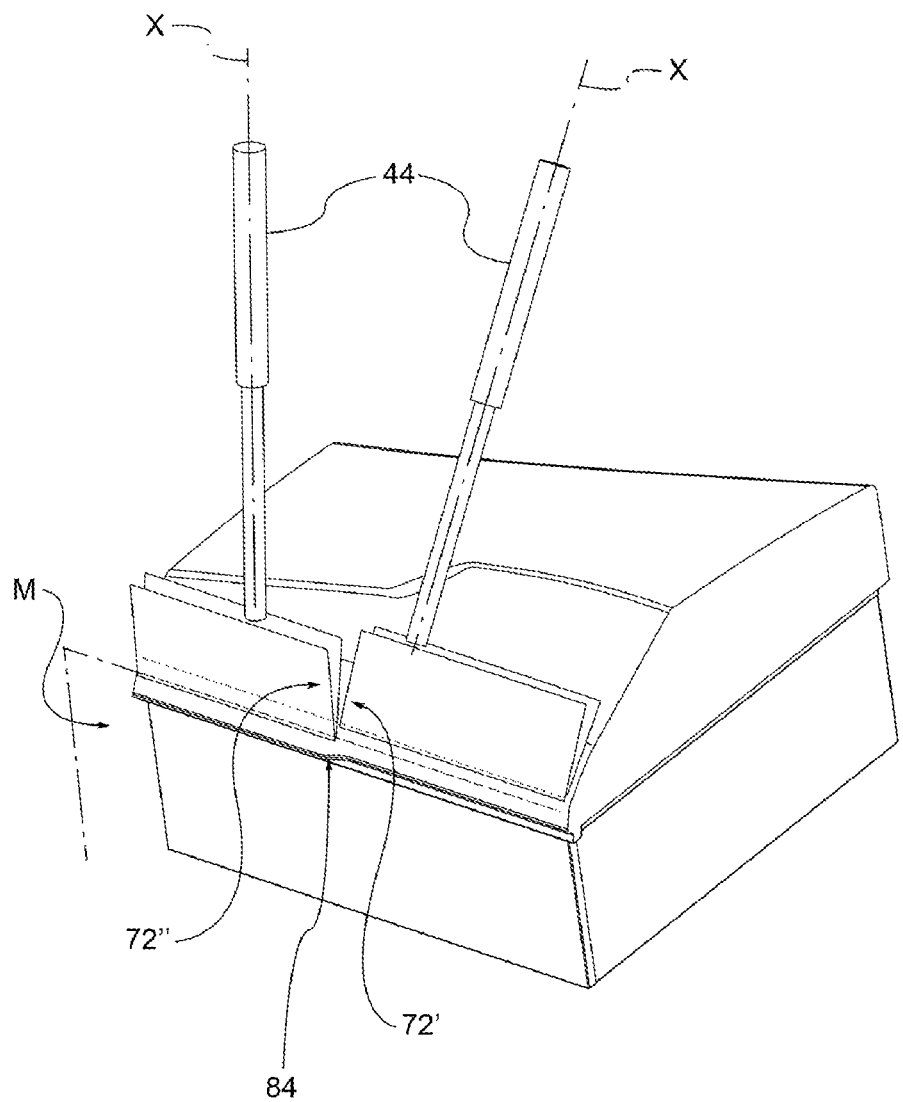

With reference to the aforementioned figures, reference numeral 4 globally denotes an automotive light, which the description which follows refers to without by so doing losing its general application.

As mentioned above, the term automotive light is understood to mean indifferently a rear automotive light or a front automotive light, the latter also known as a headlight.

As known the automotive light comprises at least one outer light of the vehicle having a lighting and/or signalling function, such as for example a sidelight, which may be a front, rear or lateral sidelight, an indicator light, a brake light, a rear fog light, a dipped beam headlight, a main beam headlight and the like.

The automotive light 4 comprises a container body 8, usually of polymeric material, which typically permits the attachment of the automotive light 4 to the relative vehicle.

For the purposes of the present invention the container body 8 may be any shape and size and may even be an element inside the automotive light, for example, not directly associated for example to the bodywork or other fastenings of the associable vehicle.

According to one embodiment, the container body 8 delimits a containment housing 12. The containment housing 12 which houses at least one light source 16, is electrically connected to electric connection for supplying power to the same, and is adapted to emit a light beam to propagate outside the automotive light 4.

For the purposes of the present invention the type of light sources 16 used is irrelevant; preferably, the light source 16 is a light source of light emitting diodes (LED).

The container body 8 is delimited by a first perimetral profile 20.

A lenticular body 24 in turn delimited internally by a second perimetral profile 28 is joined to the container body 8. The lenticular body 24 is also delimited externally by an outer wall 32 corresponding to said second perimetral profile 28.

For the purposes of the present invention the lenticular body 24 may be either external to the automotive light 4, so as to define at least one outer wall of the automotive light directly subject to the atmosphere; for the purposes of the present invention the lenticular body may also be internal to the automotive light 4, i.e. not directly subject to the external atmosphere and in turn covered directly or indirectly by one or more screens or covering panels.

According to a possible embodiment, the lenticular body 24 is suitable to close the containment seat 12. According to one embodiment, the lenticular body 24 is suitable to transmit to the outside of the automotive light 4 the light beam produced by the light source 16.

To such purpose, the lenticular body 24 is made of at least partially transparent or semi-transparent or translucent material, and may also comprise one or more opaque portions, so as to allow in any case the at least partial crossing of the light beam produced by the light source 16.

The second perimetral profile 28 is counter-shaped relative to the first perimetral profile 20 so as to be coupled with the latter according to a shaped coupling, in the assembled configuration of the automotive light 4.

The assembly of the automotive light 4 comprises the step of joining at least partially to each other the respective first and second perimetral profiles 20, 28. For example, the step is provided for of arranging the lenticular body 24 to close the containment housing 12 of the container body 8 so as to join the respective first and second perimetral profiles 20,28, Following the joining of the respective first and second perimetral profiles 20, 28 of the container body 8 and of the lenticular body 24, the contact surface between said perimetral profiles 20, 28 defines a welding interface 36 which may have any curved shape or otherwise.

The present invention provides for joining to each other the lenticular body 24 and the container body 8, in correspondence of said perimetral profiles 20, 28, by laser welding.

During the laser welding step, the container body 8 acts as an absorbing member of a light beam emitted by a laser source or a laser emitting device and the lenticular body 24 acts as a transmissive member of said light beam.

For the purposes of the present invention the laser welding process is performed with simultaneous laser welding.

In particular, a laser welding apparatus 40 according to the present invention includes at least one laser emitter device or laser source, which emits a laser beam or a light beam or an electromagnetic radiation having a characteristic emission spectrum. Characteristic emission spectrum is taken to mean an electromagnetic radiation emitted substantially at a certain frequency or having a certain wavelength. According to possible embodiments, the laser emitter device or laser source comprises a $CO_2$ laser, in which the laser beam is produced by a gas mixture comprising $CO_2$, or a YAG laser, in which the laser beam is produced by a solid state crystal, or a laser diode (LED).

The laser emitter device or laser source is associated, for example, to a plurality of optical fibres 44 inserted for example in a support or matrix, in a known manner. The fibres 44 may then be divided or split into further groups or bundles.

The fibres 44 receive portions of the laser beam emitted by the laser emitter device and direct them towards the welding interface 36 through the lenticular body 24. In other words, each fibre 44 receives a portion of laser beam and directs it towards the welding interface 36.

For example, the fibres 44 may be mechanically fixed to a mask 48.

The apparatus 40 also includes a locking mechanism 52 of the container body 8 and the lenticular body 24 to be welded together. For example, the locking mechanism 52 comprise an attachment block 56 which houses and locks the container body 8.

The apparatus 40 further includes light guides 60 that change the spatial or angular distribution of the portions of the laser beams in output from the fibres 44, so as to collimate them all along relative optical axes X-X.

In particular, the light guides 60 include an inlet 64 which receives from the fibres 44 the laser beam produced by the laser emitting device and an outlet 68 which propagates/transmits said laser beam collimated by said guides.

In one embodiment, the apparatus 40 includes at least two adjacent light guides 60', 60" having respective free ends 72', 72" facing and mechanically separate from each other, wherein the adjacent light guides 60', 60" are configured so as to direct collimated light beams on adjacent portions of welding interface 36 so as to obtain a homogeneous and uniform distribution of the light beams along the welding interface 36 which extends without interruption.

In other words, the laser beam coming out of the two adjacent light guides 60', 60", respectively, at the respective free ends 72', 72", reaches continuous portions of the welding interface 36 forming a weld bead which extends without interruption.

According to another possible embodiment, the adjacent light guides 60', 60" are arranged on the same side with respect to a middle welding plane M perpendicular to and passing through the welding interface 36 at the free ends 72', 72" of the adjacent light guides 60', 60".

According to a further embodiment, the adjacent light guides 60', 60" are arranged on opposite sides with respect to a middle welding plane M perpendicular to and passing through the welding interface 36 at the free ends 72', 72" of the adjacent light guides 60', 60".

It is also possible for at least one of the adjacent light guides 60', 60" to be at least partially superposed to the welding interface 36 at the free ends 72', 72" of the adjacent light guides 60', 60", so that a respective middle plane of the light guide R, passing through the relative optical axis X of said at least one light guide 60', 60", at least partially intersects said welding interface 36.

According to another possible embodiment, the respective free ends 72', 72" of said adjacent light guides 60', 60" extend up to a transversal plane T, perpendicular to the middle welding plane M perpendicular to and passing through the welding interface 36.

Figure 14:
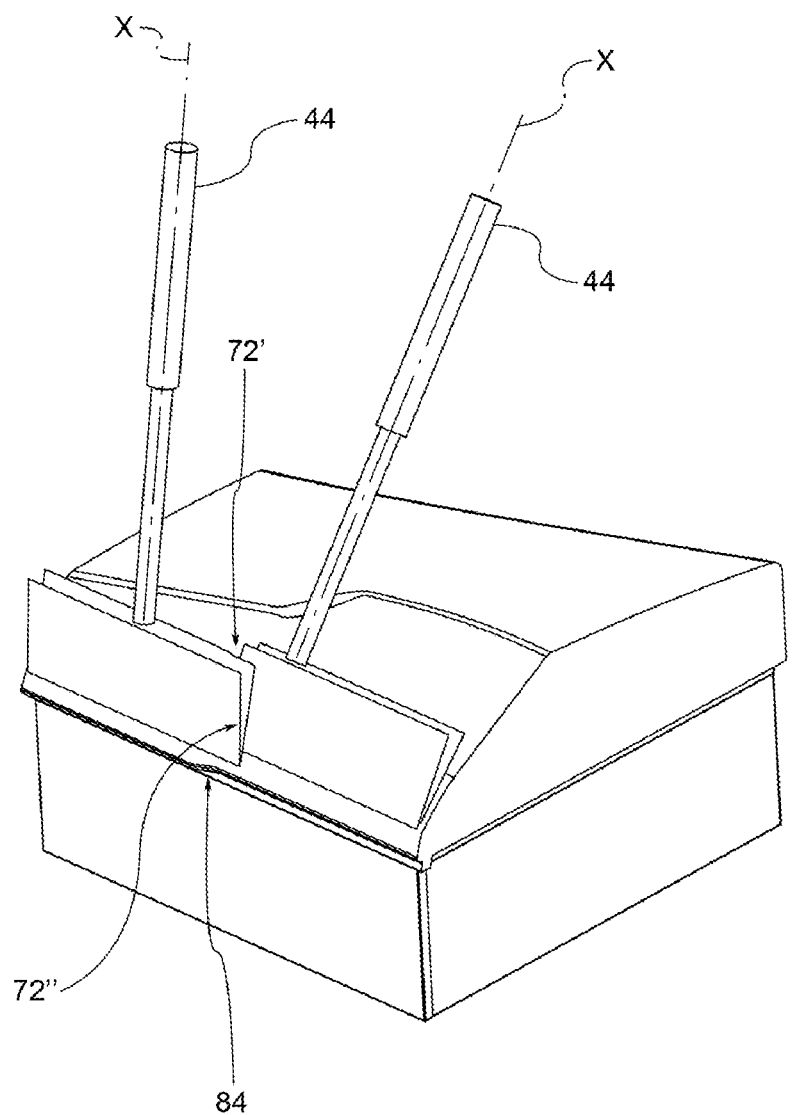

According to a further embodiment shown, for example, in FIGS. 12, 14 the respective free ends 72', 72" of the adjacent light guides 60', 60" extend beyond a transversal plane T, perpendicular to a middle welding plane M perpendicular to and passing through the welding interface 36, said free ends 72', 72" extending on opposite sides of the transversal plane T.

As shown in the Figures, the adjacent light guides 60', 60" are defined by the respective middle planes R', R" passing through the relative optical axes X; according to one embodiment, said middle planes R', R" are parallel.

According to a further possible embodiment, the adjacent light guides 60', 60" are defined by respective middle planes R', R" passing through the relative optical axes X, wherein said middle planes R', R" are incident to each other.

For example, the middle planes R', R" of the adjacent light guides 60', 60" may be perpendicular to the corresponding portion of welding interface 36.

It is also possible to provide that the middle planes R', R" of the adjacent light guides 60', 60" be inclined with respect to a plane perpendicular to the corresponding portion of the welding interface 36, respectively according to a first and a second angle of incidence α, β, said angles of incidence α, β being different.

The light guides 60', 60" have an amplitude 76 measured perpendicular to a middle plane of the light guides R passing through their optical axis X.

Figure 15A:
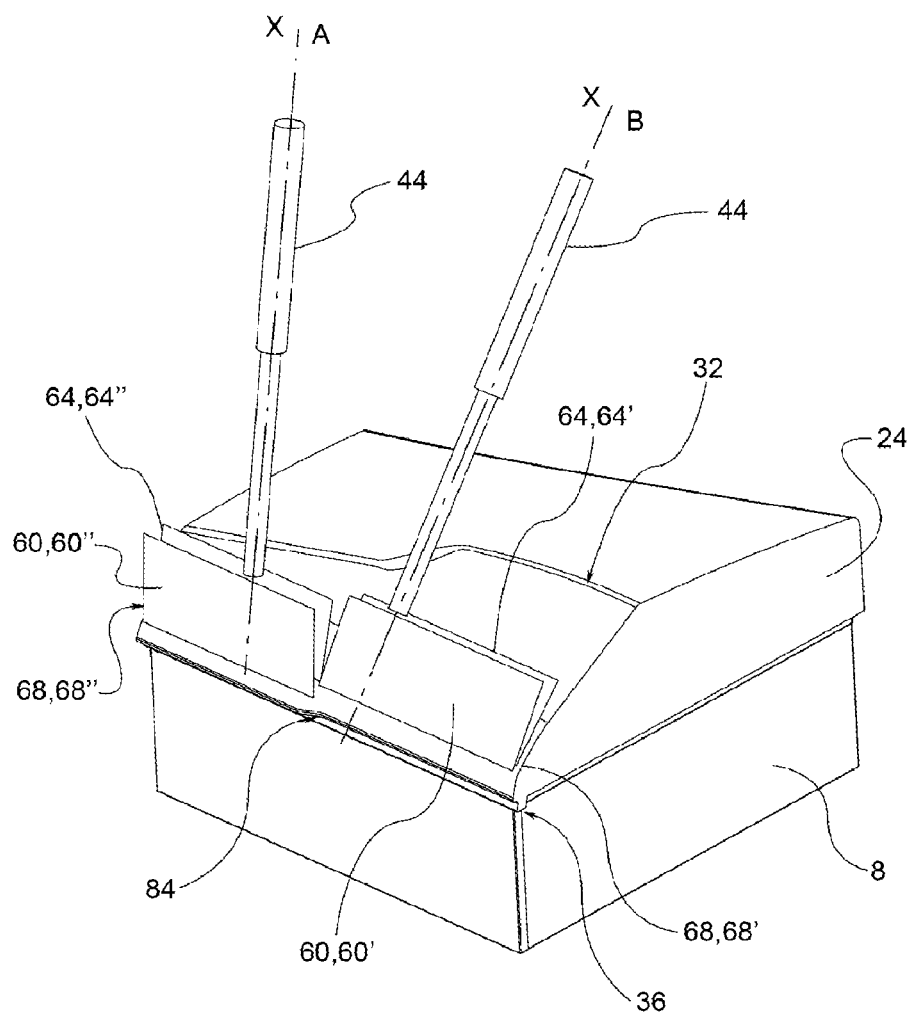
FIG. 15A is a perspective view of the apparatus.
Figure 15B:
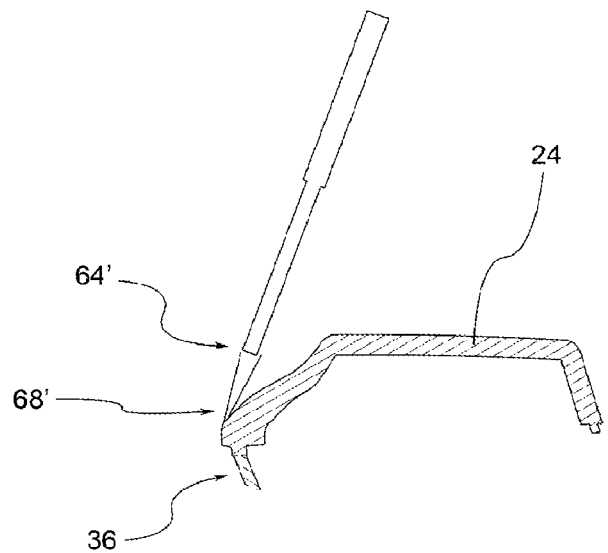
FIG. 15B is a cross-section view of the apparatus in FIG. 15A, along the cross-section plane B-B in FIG. 15A.
Figure 15C:
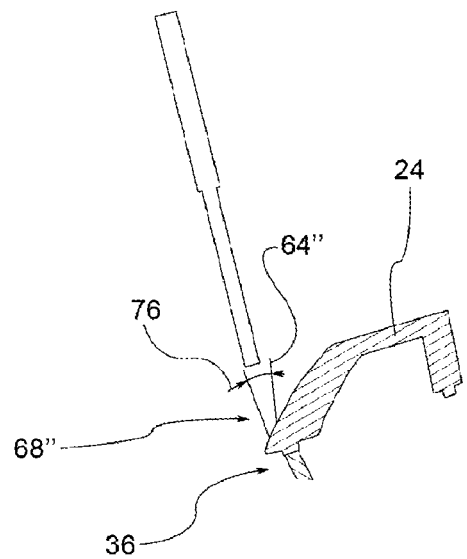
FIG. 15C is a cross-section view of the apparatus in FIG. 15A illustrating adjacent light guides having outputs that, respectively, have different amplitudes from those illustrated in FIG. 15B.

According to one embodiment, the adjacent light guides 60', 60" have outputs 68, respectively, different in amplitude 76 (FIGS. 15A, 15B, 15C).

According to one possible embodiment, the adjacent light guides 60', 60" have inlets 64, respectively different in width 76, the width 76 being measured perpendicular to a middle plane of the light guides 60', 60" passing through the respective optical axis X.

Preferably, the light guides 60', 60" have inputs 64 greater in amplitude than the respective outputs 68 so as to assume an overall wedge configuration.

The adjacent light guides 60', 60" are usually negative light guides, comprising a pair of reflecting walls 80 which are inclined symmetrically with respect to a middle plane which lies on said optical axis X-X so as to converge towards the lenticular body 24.

It is also possible to provide positive light guides 60', 60" which comprise a solid body suitable to meet the condition of total internal reflection for the at least one portion of laser beam, the solid body being made of material transparent to the emission wavelength of the laser beam.

According to one embodiment, the outlets 68 of the light guides 60', 60" are counter-shaped to the outer wall 32 of the lenticular body 24 opposite the second perimetral profile 28, so as to arrange the outputs 68 in contact with said outer wall 32 to press the lenticular body 24 against the container body 8.

The free ends 72', 72" are arranged in correspondence with a change in the profile/geometry of the lenticular body 24, such as a rib or fillet or the variation in radius of curvature or the like 84, arranged at the outer wall 32 of the lenticular body 24 opposite the second perimetral profile 28.

In fact, in the case in which the light guide 60 extends without interruption, as in the solutions of the prior art, at such change of profile/geometry 84 of the lenticular body 24, the incident light beams tend to propagate in the lenticular body 24 towards the welding interface 36 in a manner difficult to control and thus reach the welding interface on a portion thereof extending locally without interruption, in a rather heterogeneous and uneven manner.

In other words, the light beam of a conventional light guide would tend to create an excessive or insufficient irradiation of the welding interface 36 thus leading to welding defects due, for example, to poor mechanical joining (in the case of insufficient irradiation) or to an unsatisfactory mechanical joint from an aesthetic point of view due to uncontrolled local melting of the container body 8 and/or lenticular body 24 (in the case of excessive radiation).

The present invention, in the case of welding automotive lights with lenticular bodies 24 having variations in profile/geometry 84, thus discloses the splitting or breaking, possible overlapping, of adjacent light guides 60', 60" so as to obtain respective free ends 72', 72" mechanically separate from each other.

In this way, said light guides 60', 60' and in particular the free ends 72', 72" are able to direct the light beam onto the welding interface 36 so as to form a homogeneous and locally uniform weld bead at a variation of the profile/geometry 84 of the lenticular body 24 which, as seen, is a critical point of welding.

As a result, the technical expedients in terms of geometry, amplitude, mutual positioning and inclination of the adjacent light guides 60', 60" and respective free ends 72', 72" must be adapted each time to the specific geometry of the lenticular body 24 in order to achieve optimum welding.

The welding method of an automotive light according to the present invention will now be described. In particular the welding method includes the steps of:

providing a container body 8 delimited by a first perimetral profile 20, providing a lenticular body 24 internally delimited by a second perimetral profile 28, mutually associating at least partially the respective first and second perimetral profiles 20, 28 of the container body 8 and of the lenticular body 24, the contact surface between the perimetral profiles 20, 28 defining a welding interface 36, providing at least one laser emitting device which emits a light beam or radiation having a characteristic emission spectrum, providing a plurality of fibres 44 which receive portions of the laser beam from the laser emitting device and direct them towards the welding interface 36 through the lenticular body 24, wherein the container body 8 acts as an absorbing element towards the light beam and the lenticular body 24 acts as a transmissive element of the light beam, providing light guides 60', 60" to change the spatial, i.e. angular distribution of the portions of laser beams in output from the fibres (44), so as to collimate them overall along at least a predetermined optical axis X-X, wherein the light guides 60', 60" include an inlet 64 which receives from the fibres 44 the laser beam produced by the laser emitting device and an outlet 68 which propagates/transmits said collimated laser beam, arranging at least two adjacent light guides 60', 60" having respective free ends 72', 72" facing and mechanically separate from each other, configuring the adjacent light guides 60', 60" so as to direct collimated light beams on adjacent and locally continuous portions of welding interface 36 so as to obtain a homogeneous and uniform distribution of the light beams along the welding interface 36.

The free ends 72', 72" are arranged in correspondence with a variation of the profile/geometry 84 of the lenticular body 24, such as for example a rib or fillet or the variation in radius of curvature or similar, situated at an outer wall 32 of the lenticular body 24 opposite the second perimetral profile 28.

Depending on the geometry/profile of the lenticular body 24 the method includes the steps of modifying the type, mutual position and mutual orientation of adjacent light guides 60', 60" and of their free ends 72', 72" in order to achieve a homogeneous and uniform distribution of the light beams on the welding interface 36, at a locally continuous portion thereof, in order to have a reliable welding all over the welding interface 36, including those critical welding interface portions 36 corresponding to a variation of the profile/geometry 84 of the lenticular body 24 such as fillets, ribs or similar.

As may be appreciated from the description, the manufacturing method according to the invention makes it possible to overcome the drawbacks of the prior art. In particular, the method of the present invention facilitates the use of simultaneous laser welding to automotive lights having any type of complex geometry/profile, having curvatures and thicknesses highly variable along the perimeter of the light.

Given that the light guide of the simultaneous laser apparatus according to the invention can be conformed with discontinuous portions which direct the laser beam on a locally continuous welding interface so as to adapt to the complex geometry/profile of the lenticular body.

The laser welding technique according to the present invention is not only convenient compared to alternative welding techniques of the prior art but may even be better both in terms of cost and time, for the same quality of the welding joint, compared to the solutions of the prior art in the field of automotive lights. In particular, there is a reduction of consumption and therefore of costs since a greater part of the light beam can be transmitted to the welding interface between the lenticular body and the container body.

The light beam on the interface portion of welding between the lenticular body and the container body is thus suitable to obtain a welded joint having excellent mechanical qualities, without waste of luminous power.

A person skilled in the art may make numerous modifications and variations to the methods of manufacture of automotive lights described above so as to satisfy contingent and specific requirements while remaining within the sphere of protection of the invention as defined by the following claims.

The invention claimed is:

1. A welding apparatus for making an automotive headlight comprising:

locking mechanism interconnecting a container body and a lenticular body to be welded to each other, the container body having a first perimeter profile and the lenticular body having a second perimeter profile which, placed in contact with each other, define a welding interface to be welded by said apparatus, a laser emitting device that emits a laser beam, a plurality of fibres which receive portions of the laser beam from the laser emitting device and direct them towards the welding interface through the lenticular body, wherein the container body acts as an absorbing element towards the light beam and the lenticular body acts as a transmissive element of the light beam, light guides for changing the divergence of the portions of laser beams outgoing from the fibres, so as to collimate them overall along relative optical axes, wherein the light guides include an inlet which receives from the fibres the laser beam produced by the laser emitting device and an outlet which propagates/transmits said laser beam collimated by the guides themselves, wherein the light guides include respective free ends mechanically separated from each other, and said light guides are configured so as to direct collimated laser beams on adjacent and locally continuous portions of welding interface so as to obtain a homogeneous and uniform distribution of the laser beams along the welding interface.

2. The welding apparatus as set forth in claim 1, wherein said light guides include at least two adjacent light guides having respective free ends facing and mechanically separated from each other, wherein said adjacent light guides are configured so as to direct collimated laser beams on adjacent and locally continuous portions of welding interface so as to obtain a homogeneous and uniform distribution of the light beams along the welding interface.

3. The apparatus as set forth in claim 2, wherein the adjacent light guides are defined by respective middle planes passing by the relative optical axes, wherein said middle planes are parallel to each other.

4. The apparatus as set forth in claim 3, wherein said middle planes of adjacent light guides are perpendicular to the corresponding portion of the welding interface.

5. The apparatus as set forth in claim 3, wherein the middle planes of the light guides adjacent to each other are inclined with respect to a plane perpendicular to the corresponding portion of the welding interface, respectively according to a first and a second angle of incidence, said angles of incidence being different from each other.

6. The apparatus as set forth in claim 2, wherein said adjacent light guides are arranged on the same side with respect to a middle welding plane perpendicular to and passing by the welding interface at the free ends of the adjacent light guides.

7. The apparatus as set forth in claim 2, wherein said adjacent light guides are arranged on opposite sides with respect to a middle welding plane perpendicular to and passing by the welding interface at the free ends of the adjacent light guides.

8. The apparatus as set forth in claim 2, wherein at least one of said adjacent light guides is at least partially superimposed to the welding interface at the free ends of the adjacent light guides, so that a respective middle plane of the light guide, passing by the relative optical axis of said at least one light guide, at least partially intersects said welding interface.

9. The apparatus as set forth in claim 2, wherein the respective free ends of said adjacent light guides extend up to a transversal plane, perpendicular to a middle welding plane perpendicular to and passing by the welding interface.

10. The apparatus as set forth in claim 2, wherein the respective free ends of said adjacent light guides extend beyond a transverse plane, perpendicular to a middle welding plane perpendicular to and passing by the welding interface, said free ends extending on opposite sides of said transversal plane.

11. The apparatus as set forth in claim 2, wherein the adjacent light guides are defined by respective middle planes passing by the relative optical axes, wherein said middle planes (R) are incident to each other.

12. The apparatus as set forth in claim 2, wherein the adjacent light guides have outlets, respectively, different from each other in width, the width being measured perpendicular to a middle plane of the light guides passing by the respective optical axis.

13. The apparatus as set forth in claim 2, wherein the adjacent light guides have inlets, respectively, different from each other in width, the width being measured perpendicular to a middle plane of the light guides passing by the respective optical axis.

14. The apparatus as set forth in claim 2, wherein said adjacent light guides have inlets greater in width than the respective outlets so as to take an overall wedge shape, said width being measured perpendicular to a middle plane of the light guides passing by the respective optical axis.

15. The apparatus as set forth in claim 2, wherein said adjacent light guides are negative light guides, comprising a pair of reflecting walls which are inclined symmetrically with respect to a middle plane which lies on said optical axis so as to converge towards the lenticular body.

16. The apparatus as set forth in claim 1, wherein the light guides are positive light guides which comprise a solid body adapted to meet the condition of total internal reflection for the at least one portion of laser beam, the solid body being made of material transparent to the emission wavelength of the laser beam.

17. The apparatus as set forth in claim 1, wherein the outlets of the light guides are counter-shaped with respect to an outer wall of the lenticular body opposite to the second perimeter profile, so as to arrange the outputs in contact with said outer wall to press the lenticular body against the container body.

18. The apparatus as set forth in claim 1, wherein said free ends are arranged at a variation of the profile/geometry of the lenticular body, arranged at an outer wall of the lenticular body opposite to the second perimeter profile.

19. A method of simultaneous laser welding of an automotive headlight, said method including the steps of:
   providing a container body delimited by a first perimeter profile,
   providing a lenticular body internally delimited by a second perimeter profile,
   mutually associating at least partially respective first and second perimeter profile of the container body and of the lenticular body, the contact surface between said perimeter profiles defining a welding interface,
   providing at least one laser emitting device which emits a laser beam or radiation having a characteristic emission spectrum,
   providing a plurality of fibres which receive portions of the laser beam from the laser emitting device and direct them towards the welding interface through the lenticular body, wherein the container body acts as an absorbing element towards the laser beam and the lenticular body acts as a transmissive element of the laser beam,
   providing light guides for changing the spatial distribution of the portions of laser beams outgoing from the fibres, so as to collimate them overall along at least a predetermined optical axis, wherein said optical devices include an inlet which receives from the fibres the laser beam produced by the laser emitting device and an outlet which propagates/transmits said collimated laser beam,
   arranging adjacent light guides having respective free ends mechanically separated from each other,
   configuring said light guides so as to direct collimated laser beams on adjacent and locally continuous portions of welding interface so as to obtain a homogeneous and uniform distribution of the laser beams along the welding interface.

20. The method of simultaneous laser welding for making an automotive headlight as set forth in claim 19, further including the steps of arranging said free ends at a variation of the profile/geometry of the lenticular body, arranged at an outer wall of the lenticular body opposite to the second perimeter profile.

* * * * *